(12) United States Patent  (10) Patent No.: US 7,717,453 B2
Myers  (45) Date of Patent: May 18, 2010

(54) MOTORCYCLE TRAILER CONSTRUCTION

(76) Inventor: Richard L. Myers, 9769 Boucher Rd., Otter Lake, MI (US) 48464

( * ) Notice: Subject to any disclaimer, the term of this patent is extended or adjusted under 35 U.S.C. 154(b) by 487 days.

(21) Appl. No.: 11/333,473

(22) Filed: Jan. 17, 2006

(65) Prior Publication Data
US 2007/0176396 A1   Aug. 2, 2007

(51) Int. Cl.
 *B60D 1/54* (2006.01)
(52) U.S. Cl. .................. 280/491.3; 280/415.1; 280/651
(58) Field of Classification Search ............. 280/491.3, 280/415.1, 651, 656, 63, 292, 639, 35, 647–8, 280/648, 652, 419.3
See application file for complete search history.

(56) References Cited

U.S. PATENT DOCUMENTS

| | | | |
|---|---|---|---|
| 1,327,338 A | | 1/1920 | Levinson et al |
| 1,820,765 A | | 8/1931 | Anderson |
| 2,725,242 A | | 11/1955 | Peplin |
| 3,443,268 A | | 5/1969 | Symes |
| 3,892,429 A | * | 7/1975 | dit Dalmy .................. 280/654 |
| 4,253,677 A | | 3/1981 | Wissler |
| 4,529,220 A | * | 7/1985 | Wright et al. ............... 280/656 |
| 4,645,230 A | * | 2/1987 | Hammons ................... 280/656 |
| 4,729,574 A | * | 3/1988 | Tipke ...................... 280/415.1 |
| 4,789,171 A | | 12/1988 | Porter |
| 5,215,318 A | * | 6/1993 | Capraro ...................... 280/1.5 |
| 5,249,821 A | | 10/1993 | Ricketts et al. |
| 5,308,096 A | * | 5/1994 | Smith ......................... 280/204 |
| 5,480,180 A | | 1/1996 | Fuller et al. |
| 5,570,898 A | * | 11/1996 | Albert ........................ 280/656 |
| 5,743,541 A | * | 4/1998 | Cook ....................... 280/43.13 |
| 5,924,836 A | * | 7/1999 | Kelly ......................... 414/482 |
| 6,070,555 A | * | 6/2000 | Stubbs ....................... 119/712 |
| 6,220,611 B1 | | 4/2001 | Shapiro |
| 6,375,200 B1 | * | 4/2002 | Harter ......................... 280/30 |
| 6,471,236 B1 | * | 10/2002 | Eskridge ..................... 280/648 |
| 2002/0074772 A1 | | 6/2002 | Koon |
| 2002/0096861 A1 | * | 7/2002 | Tsai ........................... 280/639 |
| 2003/0038457 A1 | * | 2/2003 | Eskridge ..................... 280/648 |
| 2003/0127835 A1 | | 7/2003 | Shapiro |
| 2004/0222617 A1 | * | 11/2004 | Darling, III ................. 280/651 |
| 2005/0104324 A1 | | 5/2005 | Richard et al. |
| 2005/0200190 A1 | * | 9/2005 | Nye ............................. 298/5 |
| 2005/0236814 A1 | * | 10/2005 | Thurm ........................ 280/656 |
| 2006/0261577 A1 | * | 11/2006 | Jones ......................... 280/651 |

* cited by examiner

*Primary Examiner*—Lesley Morris
*Assistant Examiner*—Maurice Williams
(74) *Attorney, Agent, or Firm*—Robert L. Farris; Farris Law, P.C.

(57) ABSTRACT

A motorcycle trailer has a wheeled frame which may be hitched to and unhitched from a towing motorcycle. The frame has a towbar which is movable from a projected position in which it may be hitched to the motorcycle to a retracted position in which it underlies the frame. The frame or the towbar has a handle which may be grasped by a person to enable the frame and the container conjointly to be towed by a person in a manner similar to that of a wheeled suitcase. When unhitched from the motorcycle, the frame and container may be maintained in either an upright or horizontal position.

11 Claims, 5 Drawing Sheets

MOTORCYCLE TRAILER CONSTRUCTION

This invention relates to a trailer construction which can be coupled to a towing motorcycle or uncoupled from the motorcycle and towed manually.

BACKGROUND OF THE INVENTION

A motorcyclist frequently has need for a container in which articles of clothing and equipment may be stored during travel and be removed from the motorcycle for convenience and security in the event the motorcyclist must obtain overnight or longer lodging. Storage containers of the kind presently in use include saddle bags and hard cover containers that may be removably secured to the motorcycle's luggage rack. Another type of container comprises a trailer having a wheeled frame on which a trunk-like container is secured. The available containers of this type usually remain attached to the motorcycle thereby requiring emptying of the container, or at least those articles which the cyclist wishes to use overnight. This exposes both the trailer and the container to the risk of theft. Should the trailer be separable from the cycle, there does not appear to be any combined trailer and container construction which makes it possible to reduce the size thereof in such manner as to enable it conveniently to be taken into a motel or other room.

A principal object of the present invention is to provide a motorcycle trailer including a container, the trailer being detachable from a towing motorcycle and of such construction as conveniently to be wheeled by the cyclist from the cycle to a motel or other room.

SUMMARY OF THE INVENTION

Apparatus constructed in accordance with the preferred embodiments of the invention comprises a wheeled trailer having a towbar which removably can be hitched to a towing motorcycle and supporting a container for various articles such as clothing. To the frame is attached a towbar which is movable between projected and retracted positions, the projected position being one in which the trailer may be hitched to the towing motorcycle. Movement of the towbar to its retracted position reduces the overall size of the trailer so as to make manual movement of the trailer more convenient. The trailer construction includes a handle which may be grasped by the cyclist to facilitate manual movement of the trailer and attached container in a manner similar to that in which a wheeled suitcase is towed manually.

The spacing between the wheels of the trailer and the overall width of the latter are such as to enable the trailer freely to pass through doorways, thereby enabling the trailer and container to be moved from a parking lot into a motel or other room.

The trailer may be supported in either a horizontal or upright position so as to enable convenient access to the contents of the container and minimize the space required to be occupied by the trailer.

THE DRAWINGS

Apparatus constructed in accordance with the invention is illustrated in the accompanying drawings wherein.

THE PREFERRED EMBODIMENTS

Figure 1:
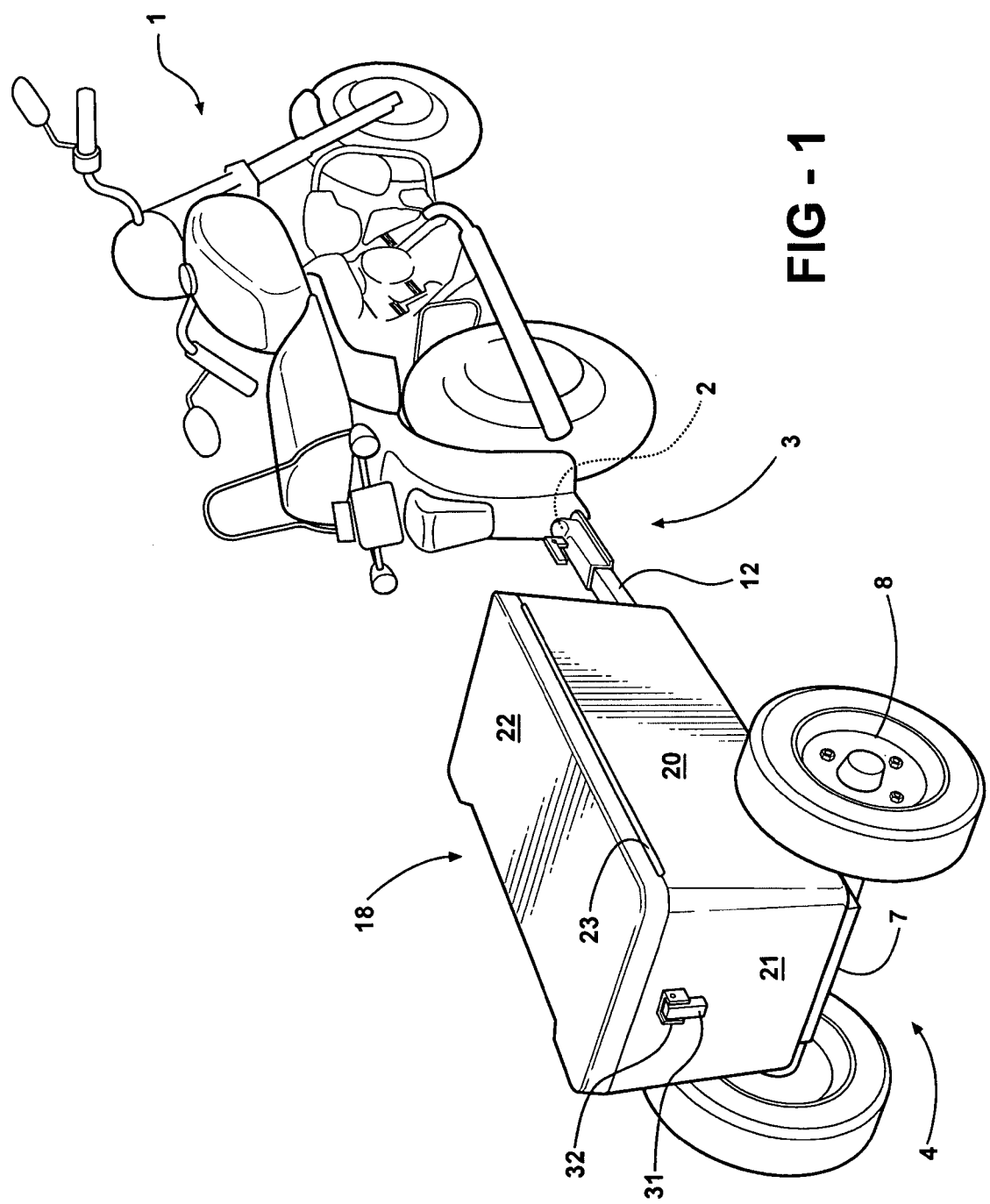
FIG. 1 is an isometric view of a trailer supporting a container and hitched to a motorcycle.

Apparatus constructed in accordance with both of the embodiments of the invention hereinafter described is adapted for use with a conventional two wheeled motorcycle 1 having a frame at the rear of which is mounted in conventional manner a spherical ball 2 forming part of a trailer hitch 3.

The trailer embodiment 4 illustrated in FIGS. 1-5 comprises a rectangular frame 5 having longitudinally extending, parallel frame bars 6 joined by cross bars 7. At least one, and preferably two, ground engaging wheels 8 are journaled on a transverse axle (not shown) mounted within a housing 9, as is conventional. The wheels are located adjacent one end of the trailer frame. At the opposite or forward end of the trailer frame is a towbar mounting structure comprising a channel shaped towbar support 10 having spaced, parallel sides 11 secured to a pair of the trailer frame cross bars 7. Rockably accommodated within the support 10 is one end of a towbar 12. The towbar and the flanges 11 are provided with aligned openings through which a pivot pin 13 extends for the purpose of enabling the towbar to be rocked about the axis of the pin. The towbar is provided with another opening (not shown) therein which may be aligned, depending on the position of the towbar, with either of two pairs of openings 14 and 15 in the support 10. A retaining pin 16 provided with a safety wire 17 may be extended through either pair of openings 14 and 15 and through a corresponding opening in the towbar so as positively to retain the towbar in either selected one of two different positions, one of which is projected and the other of which is retracted.

Secured to the frame by bolts 17 or the like is a trunk-like container 18 having a bottom 19, two upstanding side walls 20 and two upstanding end walls 21. The container also has a lid 22 pivoted to one of the side walls 20 by a hinge 23. Separable fasteners 24 enable the lid 22 to be moved between closed and open positions. If desired, a carrying strap 25 may be provided on one of the side walls 20

The trailer frame and container are adapted to be coupled to the motorcycle 1, or any other towing vehicle, by the towbar 12 which is provided at its free end with a coupling 26 forming part of the trailer hitch 3. The coupling 26 is conventional and is secured to the towbar by bolts 27 or the like. The coupling 26 forms a substantially spherical socket 28 for the removable accommodation of the hitch ball 2, as is conventional. The hitch disclosed is one that is described as a ball and socket hitch. A different kind of hitch may be used, but a ball and socket hitch enables the trailer to occupy a horizontal position resting on both wheels even when the motorcycle 1 is parked in a position in which it leans or is tilted to one side of a vertical plane. A handle 29 is secured to the hitch member 26 to facilitate raising and lowering the towbar during coupling and uncoupling of the trailer to and from the motorcycle.

Figure 2:
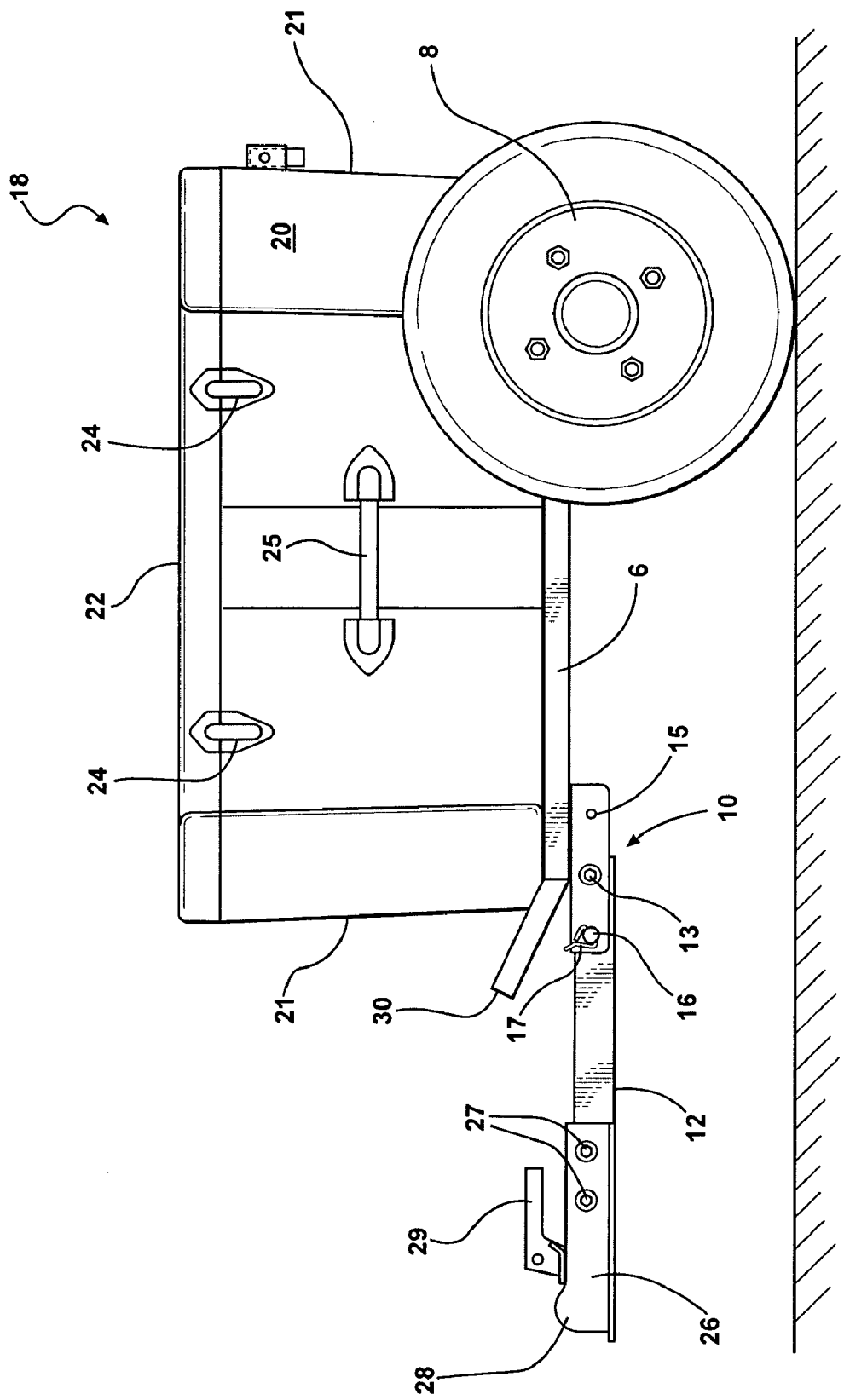
FIG. 2 is a side elevational view of the trailer and container unhitched from the motorcycle.
Figure 3:
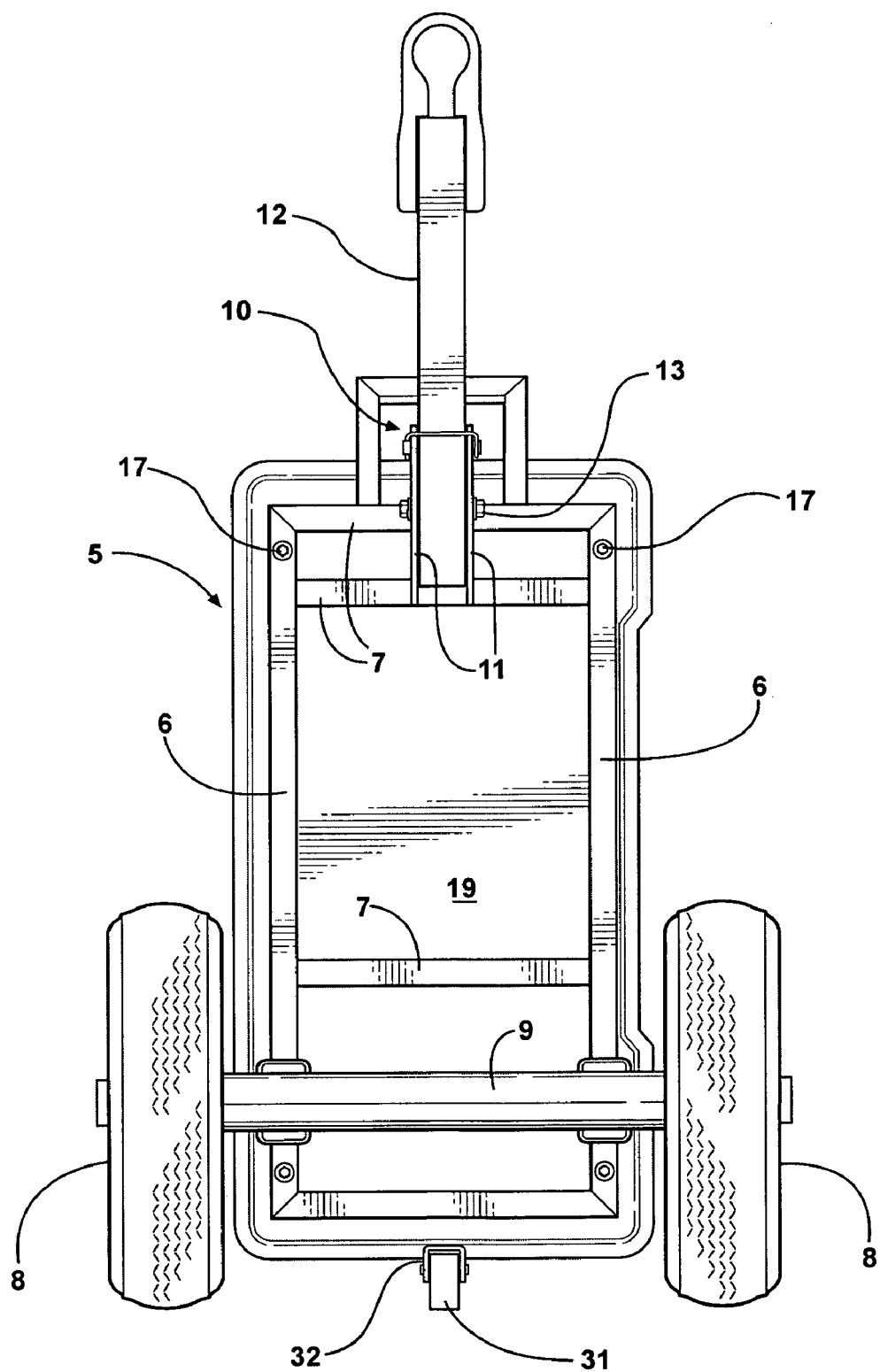
FIG. 3 is a bottom plan view of the trailer.
Figure 4:
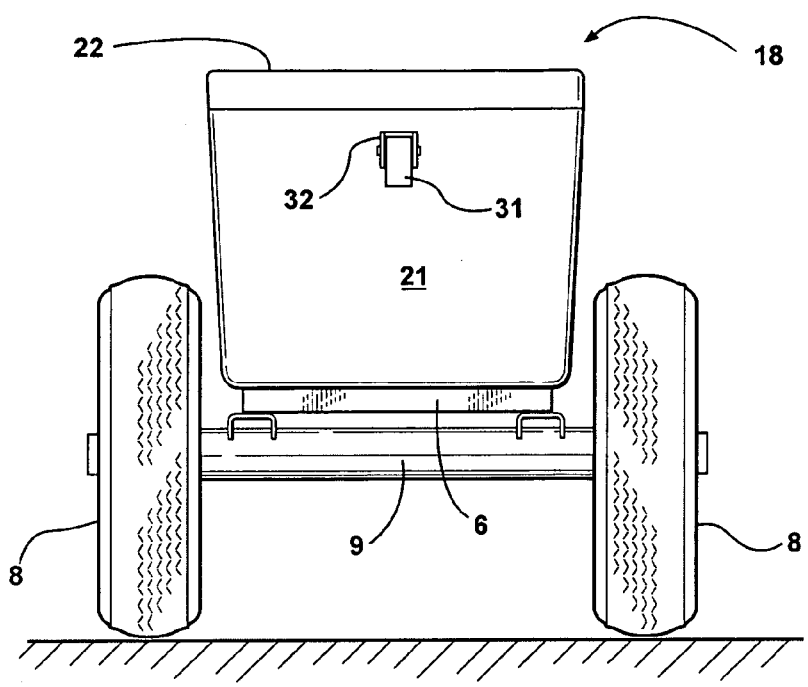
FIG. 4 is a rear elevational view of the unhitched trailer illustrating the container in a horizontal position.
Figure 5:
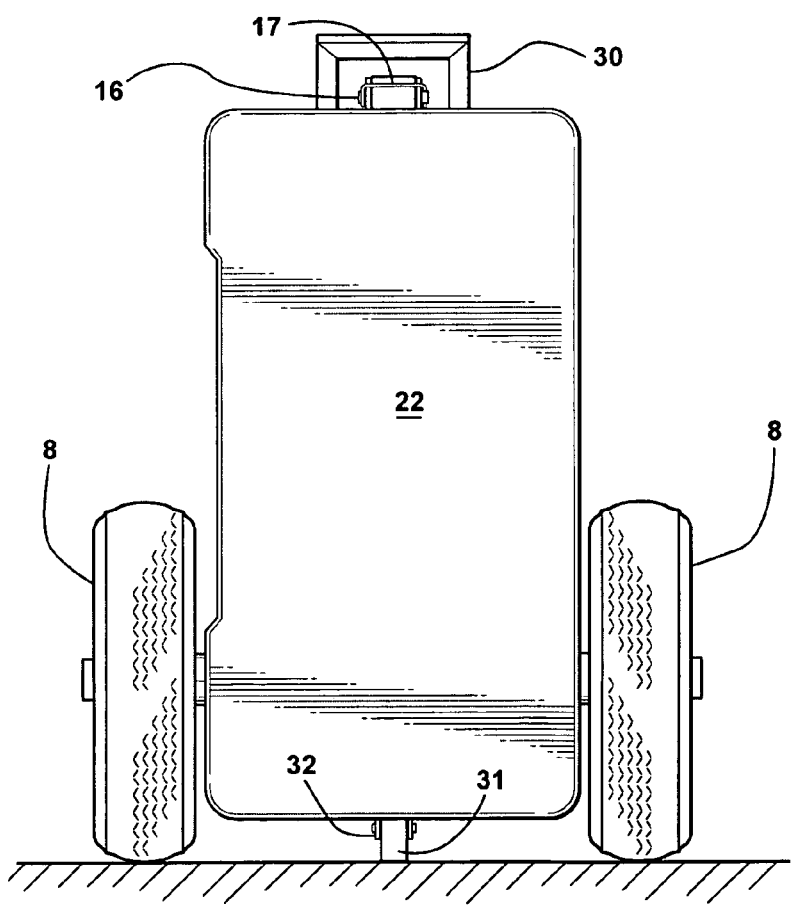
FIG. 5 is a rear elevational view similar to FIG. 4, but illustrating the container in an upright position.

In the positions of the parts shown in FIGS. 1-3 the towbar 12 is in its forwardly projecting position so as to enable the trailer to be coupled to the motorcycle. However, once the towbar has been uncoupled from the motorcycle, the towbar may be rotated from the projected position to a retracted position beneath the trailer frame. This change in position may be accomplished by removing the retaining pin 16 from the position shown in FIGS. 1 and 2 and rotating the towbar about the axis of the pivot pin 13 to a retracted position 180° removed from the projected position. The retaining pin 16 then may be extended through the openings 15 in the support 10 and the aligned opening in the towbar so as to retain the towbar in its retracted position.

When the towbar has been moved to its retracted position the trailer and container may be rolled manually and conjointly in the manner that a wheeled suitcase is rolled manually from one position to another. Such manual movement or towing of the trailer is facilitated by a U-shaped handle 30 which is secured to and projects forwardly and upwardly from the forward end of the trailer frame.

To facilitate movement of the trailer and attached container through a doorway of a motel or other room, the spacing between the wheels 8 should be such as to enable the trailer to pass through a doorway without interference.

When the trailer and container have been uncoupled from the motorcycle and moved to a position in which access to the contents of the container is desired, the trailer and container may be rocked as a unit about the axis of rotation of the wheels 8 so that the rear wall 21 of the container confronts the ground or floor. Such rocking movement is possible because the distance from the axis of rotation of the wheels to the rear end of the container is no greater than the length of the radius of the wheels, thereby enabling such rocking movement while the wheels remain in ground engagement.

In some cases it may be desirable that the container extends substantially vertically and occupies an upright position. For this purpose a leveling bar 31 pivoted in a clevis 32 may be swung from a retracted position as shown in FIGS. 1 and 2 to a projected position, as shown in FIG. 3, in which the leveling bar 31 extends beyond the rear wall 21 and engages the ground or floor, thereby providing, with the wheels 8, a stable, three-point support for the trailer and container.

Figure 6:
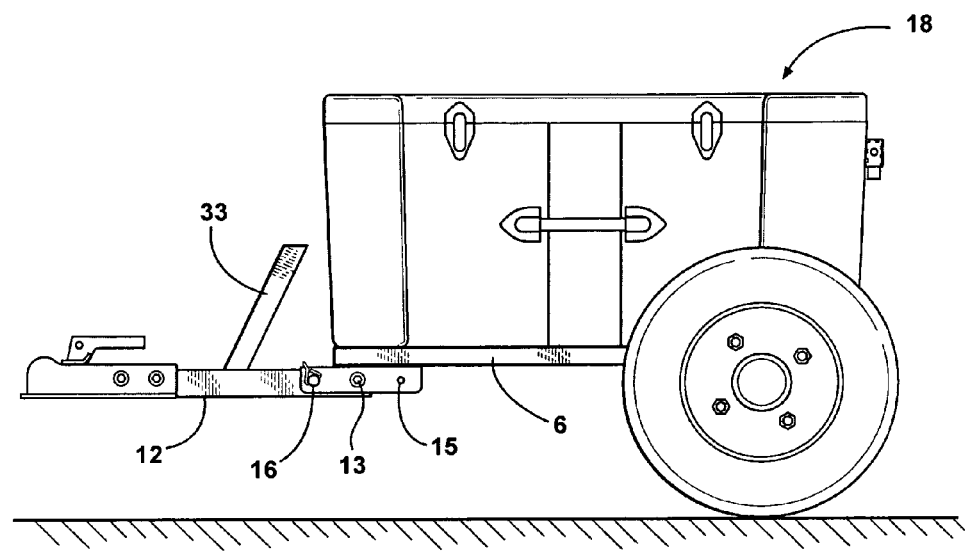
FIG. 6 is a side elevational view illustrating a modification.
Figure 7:
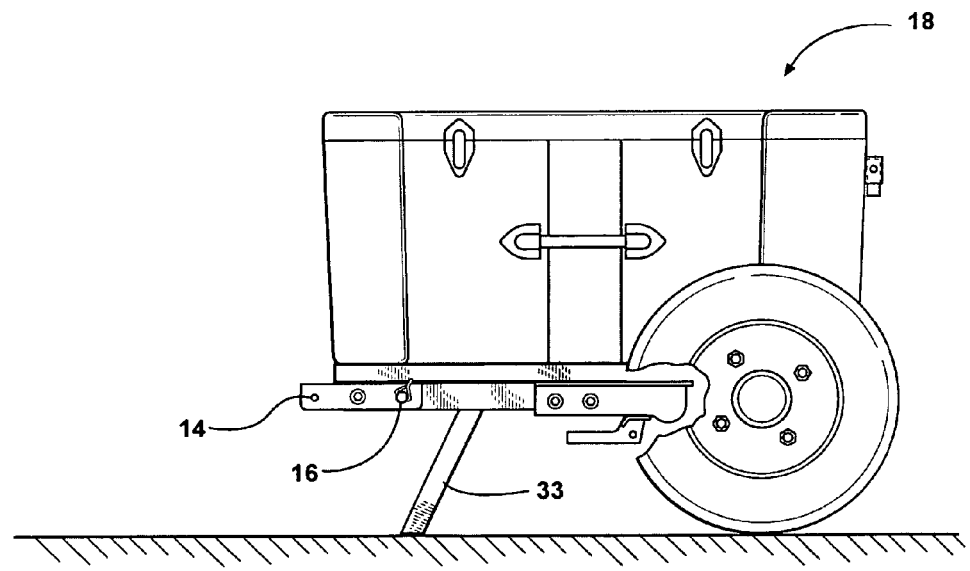
FIG. 7 is a side elevational view, partly broken away, and illustrating parts of the apparatus shown in FIG. 6 in adjusted positions.

The embodiment of the invention shown in FIGS. 6 and 7 is virtually the same as that which has been described earlier. The principal difference is that, in the embodiment of FIGS. 6 and 7, the handle 30 is replaced by a U-shaped handle 33 which, instead of being secured to the trailer frame 7, is secured to the towbar 12. As a result of this arrangement, the handle 33 will be rotated with the towbar 12 to its retracted position, as shown in FIG. 7, and together with the wheels 8, support the frame and container in a substantially horizontal position.

The disclosed embodiments are representative of presently preferred forms of the invention, but are intended to be illustrative rather than definitive thereof. The invention is defined in the claims.

I claim:

1. A trailer construction comprising a frame member; a towbar member; a storage container supported by and attached to said frame member by at least one bolt and having forward and rearward ends; coupling means connecting said towbar member to one end of said frame member and for movements from a towing position in which said towbar member extends beyond said frame member and said container for connection to a towing vehicle to a retracted position in which said towbar member is free from said vehicle and occupies a position beneath said container; and at least one ground engageable wheel mounted on said frame member, for rotation about an axis and extending beyond said frame member for ground engagement, said frame member and said container being swingable conjointly about said axis when said towbar member is in said retracted position and while said wheel is in ground engagement from a first position in which said container is atop said frame member to a second frame position in which said frame member and said container are in a second, upright position and are supported by said wheel and a leveling bar pivotally connected to a clevis mounted on the storage container for pivotal movement to a projected position extending away from the rear wall to establish a support with the at least one ground engageable wheel supporting the rearward end of said container in the second upright position, a handle secured to the towbar member and extending upwardly from the towbar member and toward the storage container when the towbar member is in the towing position and extends beyond said frame member, and wherein the handle secured to the towbar member extends downward from the towbar member when said towbar member occupies the retracted position beneath said container and the handle is in a position to cooperate with said at least one ground engageable wheel and support said container in a horizontal position.

2. The construction according to claim 1 wherein said coupling means connects said towbar member and said frame member for rocking movements of said towbar member relative to said frame member.

3. The construction according to claim 1 wherein said handle secured to one of said members in a position to extend forwardly of said container and enable manual and conjoint movement of said frame member and said container when said towbar member is disconnected from said towing vehicle.

4. The construction according to claim 3 wherein said handle and said wheel support said frame member and said container in a substantially horizontal position when said towbar member is in said retracted position.

5. The construction according to claim 1 wherein said leveling member is movable between retracted and extended positions.

6. The construction according to claim 1 wherein said coupling means rockably couples said towbar member to said frame member.

7. The construction according to claim 6 wherein said coupling means includes removable retainer means for retaining said towbar member in a selected one of said towing and retracted positions.

8. A motorcycle trailer construction comprising a frame member; a towbar member; hitch means carried by said towbar member for removably hitching said towbar member to a motorcycle; a storage container having a forward end and a free rearward end carried by and clamped to said frame member by at least one bolt; coupling means coupling said towbar member to said frame member for movements of a said towbar member from a projected position in which said hitch means may be hitched to said motorcycle to a retracted position in which said towbar member and said hitch means underlie said frame member; a pair of ground engageable wheels carried by said frame member and rotatable about an axis of rotation, each said wheel having a radius centered at said axis, the distance from said axis to said free rearward end of said container being no greater than the length of said radius, thereby enabling rocking of said frame member and said container as a unit about the axis of rotation of said wheels while said wheels remain in ground engagement from a substantially horizontal position to a substantially upright position; a leveling bar pivotally connected to a clevis mounted on the free rearward end of the storage container for pivotal movement from a vertical position when the storage container is in the substantially horizontal position to a projected position extending away from the free rearward end to establish a support with the pair of ground engaging wheels when the storage container is in the substantially upright position, and a handle secured to the towbar member and extending upwardly from the towbar member and toward the storage container when the towbar member is in the projected position, and wherein the handle secured to the towbar member extends downward from the towbar member when the towbar member is in the retracted position and the handle is in a position to cooperate with said pair of ground engageable wheels to support said container in the substantially horizontal position.

9. The construction according to claim 8 wherein said coupling means connect said towbar member to said frame member for rocking movements relative to said frame member.

10. The construction according to claim 8 wherein said handle secured to one of said members in a position to extend forwardly beyond said container and enable manual and conjoint movement of said frame member and said container when said towbar member is disconnected from said towing vehicle.

11. The construction according to claim 8 wherein the length of said radius is greater than the distance from said axis of rotation to said free rearward end of said container.

* * * * *